US010187580B1

(12) United States Patent
Beard et al.

(10) Patent No.: US 10,187,580 B1
(45) Date of Patent: Jan. 22, 2019

(54) ACTION CAMERA SYSTEM FOR UNMANNED AERIAL VEHICLE

(71) Applicant: Draganfly Innovations Inc., Saskatoon (CA)

(72) Inventors: Paul Beard, Bigfork, MT (US); Craig McDermott, Cedar Rapids, IA (US); Cameron Chell, Calgary (CA); Erika Racicot, Calgary (CA); Jamie Clarke, Calgary (CA); Bruce McDonald, Iowa City, IA (US); Paul Readwin, Calgary (CA)

(73) Assignee: Dragonfly Innovations Inc., Calgary (CA)

( * ) Notice: Subject to any disclaimer, the term of this patent is extended or adjusted under 35 U.S.C. 154(b) by 0 days.

(21) Appl. No.: 15/707,752

(22) Filed: Sep. 18, 2017

Related U.S. Application Data

(63) Continuation of application No. 14/533,995, filed on Nov. 5, 2014, now Pat. No. 9,769,387.
(Continued)

(51) Int. Cl.
*H04N 5/232* (2006.01)
*H04N 7/18* (2006.01)
(Continued)

(52) U.S. Cl.
CPC ....... *H04N 5/23296* (2013.01); *G06K 9/0063* (2013.01); *G06T 7/80* (2017.01);
(Continued)

(58) Field of Classification Search
CPC ........ G06K 9/0063; G06T 2207/10004; G06T 2207/30232; G06T 7/0042; H04N 5/23296; H04N 7/181
See application file for complete search history.

(56) References Cited

U.S. PATENT DOCUMENTS 7,418,320 B1  8/2008  Bodin et al.
8,331,614 B2  12/2012  Mannerheim et al.
(Continued)

FOREIGN PATENT DOCUMENTS

WO    1996017258 A2    6/1996

OTHER PUBLICATIONS

Mark Prigg, Drone that can follow you home: The 'personal quadcopter' that can automatically follow its owner and take pictures and video, Daily Mail MailOnline, Published May 13, 2013, 5 pages, Found online at: http://www.dailymail.co.uk/sciencetech/article-2323761/The-drone-follow-home-Firm-reveals-personal-quadcopter-automatically-bllow-owner-pictures-video.html.

(Continued)

*Primary Examiner* — Anner N Holder
(74) *Attorney, Agent, or Firm* — Suiter Swantz pc llo

(57) ABSTRACT

An action camera system for an unmanned aerial vehicle (UAV) selects a target based on a reference image captured by an onboard camera. Image processing determines a desired orientation of the target to the UAV, by which the UAV can track the target and provide streaming video images from the desired orientation. Image processing establishes a visual lock on the target and controls the UAV to maintain the desired orientation while capturing streaming images. Additional position data provided by sensors aboard a smartphone carried by the target enhances the tracking ability of the action camera system and enables predictive analysis of the target's future position. The action camera system may additionally provide preselected modes of operation that control UAV movement and image capture depending on the user's desired objectives.

10 Claims, 8 Drawing Sheets

Related U.S. Application Data

(60) Provisional application No. 61/899,921, filed on Nov. 5, 2013, provisional application No. 61/949,801, filed on Mar. 7, 2014, provisional application No. 61/949,809, filed on Mar. 7, 2014, provisional application No. 62/025,581, filed on Jul. 17, 2014, provisional application No. 62/036,830, filed on Aug. 13, 2014, provisional application No. 62/036,919, filed on Aug. 13, 2014, provisional application No. 62/054,695, filed on Sep. 24, 2014.

(51) Int. Cl.
 *G06K 9/00* (2006.01)
 *G06T 7/80* (2017.01)

(52) U.S. Cl.
 CPC ... *H04N 7/181* (2013.01); *G06T 2207/10004* (2013.01); *G06T 2207/30232* (2013.01)

(56) References Cited

U.S. PATENT DOCUMENTS

| | | | |
|---|---|---|---|
| 8,979,032 B1 | 3/2015 | Hester, Jr. et al. | |
| 9,019,376 B2* | 4/2015 | Lee | H04N 7/185 |
| | | | 348/143 |
| 9,026,272 B2 | 5/2015 | Kokkeby et al. | |
| 9,164,506 B1 | 10/2015 | Zang | |
| 9,511,878 B1* | 12/2016 | McDermott | B64D 45/00 |
| 2003/0212478 A1 | 11/2003 | Rios | |
| 2005/0004723 A1 | 1/2005 | Duggan et al. | |
| 2006/0271251 A1 | 11/2006 | Hopkins | |
| 2007/0093945 A1 | 4/2007 | Grzywna et al. | |
| 2007/0286456 A1* | 12/2007 | Ariyur | G06K 9/32 |
| | | | 382/103 |
| 2008/0054158 A1 | 3/2008 | Ariyur et al. | |
| 2009/0087029 A1 | 4/2009 | Coleman et al. | |
| 2009/0138138 A1* | 5/2009 | Ferren | G05D 1/0676 |
| | | | 701/3 |
| 2009/0157233 A1 | 6/2009 | Kokkeby et al. | |
| 2010/0157055 A1 | 6/2010 | Pechatnikov | |
| 2011/0295569 A1 | 12/2011 | Hamke et al. | |
| 2011/0298939 A1 | 12/2011 | Melikian | |
| 2012/0200703 A1* | 8/2012 | Nadir | G02B 27/644 |
| | | | 348/144 |
| 2012/0307042 A1* | 12/2012 | Lee | G08G 5/0069 |
| | | | 348/114 |
| 2013/0022202 A1 | 1/2013 | Stroud | |
| 2014/0316616 A1 | 10/2014 | Kugelmass | |
| 2014/0334668 A1* | 11/2014 | Saund | G06T 7/20 |
| | | | 382/103 |
| 2014/0336848 A1 | 11/2014 | Saund et al. | |
| 2015/0032295 A1 | 1/2015 | Stark et al. | |
| 2016/0343118 A1* | 11/2016 | Olsen | G06T 5/009 |

OTHER PUBLICATIONS

NASA, Autonomous Vehicles—Quadcopter, Publication date Aug. 21, 2013, NASA, 1 page, Found online at: http://www.nasa.gov/centers/langley/multimedia/iotw-quadcopter.html#.UouPJ9Lku8A.

* cited by examiner

ACTION CAMERA SYSTEM FOR UNMANNED AERIAL VEHICLE

For purposes of the USPTO extra-statutory requirements, the present application constitutes a continuation of the United States patent application entitled ACTION CAMERA SYSTEM FOR UNMANNED AERIAL VEHICLE, Ser. No. 14/533,995, naming as inventors Paul Beard, Craig McDermott, Cameron Chell, Erika Racicot, Jamie Clarke, Bruce McDonald, and Paul Readwin, filed Nov. 5, 2014.

CROSS-REFERENCE TO RELATED APPLICATIONS

This application claims priority under 35 U.S.C. § 119(e) to provisional patent applications: U.S. Ser. No. 61/899,921 filed on Nov. 5, 2013; U.S. Ser. No. 61/949,801 filed on Mar. 7, 2014; U.S. Ser. No. 61/949,809 filed on Mar. 7, 2014; U.S. Ser. No. 62/025,581 filed on Jul. 17, 2014; U.S. Ser. No. 62/036,830 filed on Aug. 13, 2014; U.S. Ser. No. 62/036,919 filed on Aug. 28, 2014; U.S. Ser. No. 62/054,695 filed on Sep. 24, 2014. Said applications are herein incorporated by reference in their entirety.

TECHNICAL FIELD

Embodiments of the present invention relate generally to unmanned aerial vehicles and particularly for a system and method of selecting and following a moving target object at a predetermined orientation while photographing the target object via onboard camera.

BACKGROUND

Unmanned aerial vehicles (UAV) (ex.—drones) include aircraft controlled by onboard automated control systems or operated remotely by a human pilot. UAVs of all sizes are useful for both military and civilian applications, but portable multirotor vehicles—essentially miniature helicopters—are simple and accessible enough to be in demand for home and personal use. A quadcopter or quad-rotor UAV, for example, includes four rotors usually fixed in a lightweight airframe, but UAVs with three, five, or six rotors are also common. Regardless of the precise design particulars, personal UAVs operate according to applied physics. A quadcopter may include two pairs of motor-driven rotors, each rotating in the opposite direction at high speeds to produce lift and thrust and enable the UAV to take off and land vertically and to hover in place. Steering and attitude control along multiple axes is achieved through varying the rotational speed of one or more rotors to disturb the equilibrium of the hovering state and induce movement in one or more directions.

The simplicity and agility of a multirotor UAV makes it a useful platform for cyclists, skiers, snowboarders, or other sporting enthusiasts who wish to record their exploits under extreme conditions. For example, the logistics of trailing a cyclist descending a mountain pass, or a basejumper parachuting from a cliff, are complicated for a camera crew (or even a single cameraman) by the problems of safely navigating inaccessible and dangerous terrain at speed while at the same time keeping in view a subject who may repeatedly and unpredictably change position and heading dozens of times per minute. Mounting a video camera to a UAV provides a potential solution to both problems as well as the opportunity for real-time streaming video images for remote viewing. It may therefore be desirable to provide a remotely or autonomously controlled UAV with the means to identify, follow, and provide a continuous video feed of a target subject in motion.

SUMMARY

Some embodiments of the present invention concerns a method for tracking at least one target selected from one or more potential targets via an action camera system onboard an unmanned aerial vehicle (UAV). In one embodiment, the action camera system selects a target. In one embodiment, the action camera system captures a reference image via an onboard camera, the images defining a desired orientation of the target to the UAV and including image elements corresponding to the target and to a pattern uniquely associated with the target. In one embodiment, the action camera system determines one or more tracking parameters associated with the desired orientation based on the reference image. In one embodiment, the action camera system captures additional images defining subsequent orientations of the target to the UAV. In one embodiment, the action camera system defines one or more second tracking parameters associated with subsequent orientations based on the additional images. In one embodiment, the action camera system receives additional position data from a smartphone carried by the target. In one embodiment, the action camera system maintains a desired orientation of the target to the UAV by adjusting the camera angle or rotor speeds of the UAV based on the second tracking parameters and position data.

Other embodiments of the invention concern an action camera system for selecting and tracking a target while capturing streaming video via a camera onboard an unmanned aerial vehicle (UAV). In one embodiment, the action camera system includes a camera fixed to the UAV which captures images defining an orientation of the target to the UAV. In one embodiment, the action camera system includes an imaging processor connected to the camera, for processing the images and received position data and controlling the UAV based on the image and data processing. In one embodiment, the action camera system includes an attitude control system for controlling the speed, orientation and direction of the UAV by adjusting rotor speeds. In one embodiment, the action camera system includes onboard attitude sensors for determining absolute and relative orientations of the UAV.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which.

DETAILED DESCRIPTION

Figure 1A:
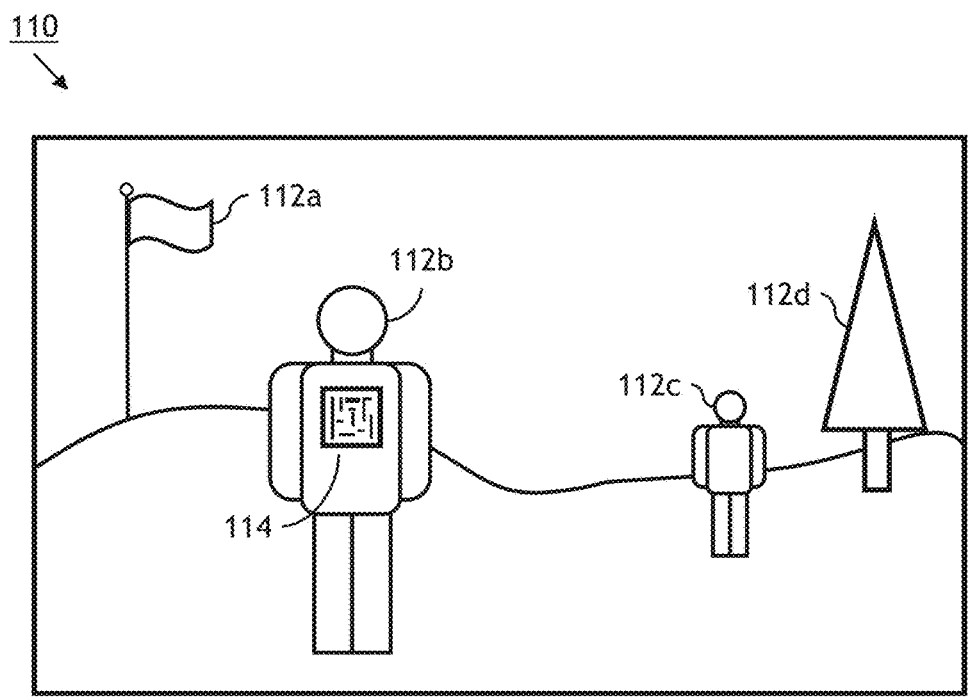
FIGS. 1A-1F are illustrations of images captured by embodiments of the present invention.

Features of the invention in its various embodiments are exemplified by the following descriptions with reference to the accompanying drawings, which describe the invention with further detail. These drawings depict only selected embodiments of the invention, and should not be considered to limit its scope in any way.

In one embodiment, an action camera system 200 incorporated aboard a UAV 100 determines trackable objects and selects one as its target, either automatically or remotely according to user input. In one embodiment, the action camera system 200 follows the target 118 as it moves, defining an initial orientation of the target 118 to the frame 110 and adjusting the position and speed of UAV 100 in order to maintain the initial orientation. In one embodiment, a selected target 118 is uniquely associated with a distinct pattern 114 for which the action camera system 200 will continually scan incoming images 110. In one embodiment, the action camera system 200 uses the distinct pattern 114 to maintain its lock on the target 118 and determine the current orientation of the target 118 to the frame 110. For example, the action camera system may determine a relative distance to the target 118 based on the pixel size of the target 118 or the pattern 114 relative to that of the frame 110. In one embodiment, the action camera system 200 uses information about the current orientation of the target 118 to the frame 110 to adjust the speed or position of UAV 100 and maintain the initial orientation (e.g., keep a skier centrally framed at a fixed distance as s/he proceeds through a downhill run). In one embodiment, the action camera system 200 enables the capture of real-time streaming video from multiple unique perspectives, e.g., providing a skier's eye view of the downhill run without encumbering the skier with bulky video equipment. In one embodiment, the action camera system 200 may be pre-programmed with various modes of operation for generating real-time video streams tailored to a particular activity, e.g., winter sports, basketball, football, etc.

In one embodiment, the visual intelligence of the action camera system 200 is enhanced by real-time position data provided by sensors associated with, or fixed to, the target 118. For example, a target 118 may carry a smartphone 140 equipped with position sensors, which in turn relay position data via wireless link to the action camera system 200. In one embodiment, the action camera system 200 then uses position data to more accurately keep the target 118 in a desired orientation relative to the frame 110. In one embodiment, the action camera system 200 also uses position data to supplement visual intelligence in the event target 118 makes rapid changes in speed or direction that visual intelligence alone may not be able to account for. For example, the action camera system 200 may use position data to plot future trajectories of target 118 based on prior positions, or to re-establish contact with target 118 if the system cannot maintain or establish a visual lock.

Figure 1B:
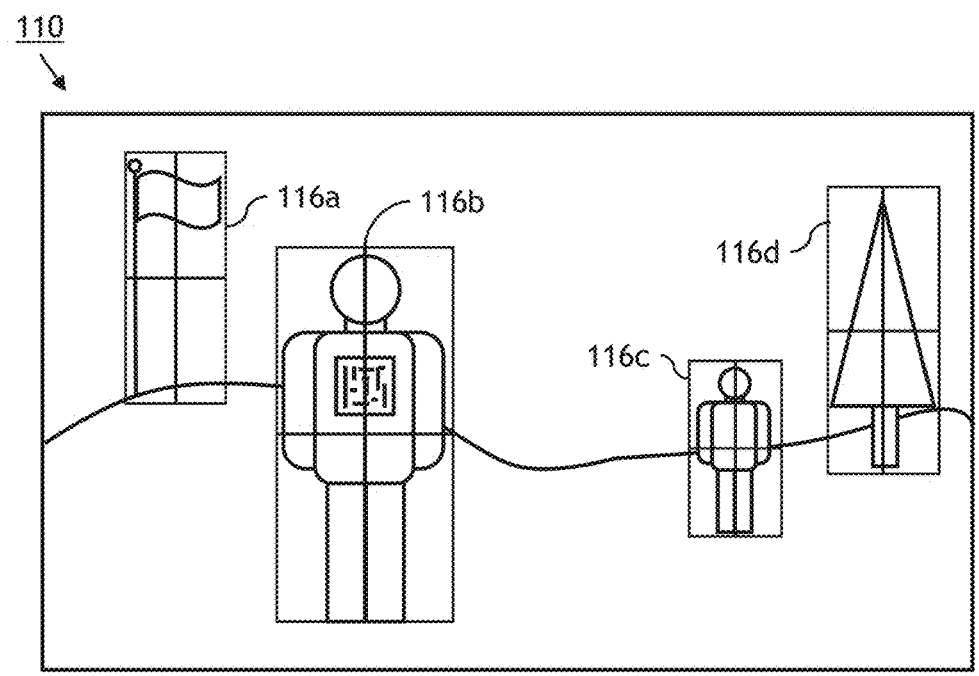

FIG. 1A illustrates a frame 110 representing an image captured by the action camera system 200 according to embodiments of the present invention. In one embodiment, frame 110 is a reference frame from which action camera system 200 identifies potential target objects 112a, 112b, 112c, and 112d. For example, potential target objects may include human or animal subjects, natural features, or man-made landmarks. Referring to FIG. 1B, In one embodiment, the action camera system may identify potential target objects 112a, 112b, 112c, and 112d via bounding boxes 116a, 116b, 116c, and 116d. In one embodiment, the action camera system 200 may use bounding boxes 116 to determine a relative orientation of potential target objects 112 based on the orientation of bounding boxes 116 to frame 110. For example, if the action camera system 200 has stored information about the actual size or position of tree 112d, the system may be able to determine a relative position of UAV 100 or other potential target objects 112 to the tree 112d. In one embodiment, referring to FIG. 1A, human subject 112b is denoted by a distinct pattern 114 uniquely associated with the subject 112b. In one embodiment, the pattern 114 includes a pseudorandom pattern including ratios of more than one color, a retroreflective surface, a QR code or barcode, or any other similarly distinctive pattern that can be scanned by the image processor 234 of the action camera system 200. In one embodiment, the pattern 114 is fixed to a subject 112 at any visible location where a clear line of sight can be provided to UAV 100. In one embodiment, the action camera system 200 has information about the actual size of pattern 114 and determines an orientation of subject 112b (e.g., its relative distance from UAV 100) based on the size of pattern 114 relative to the frame 110.

Figure 1C:
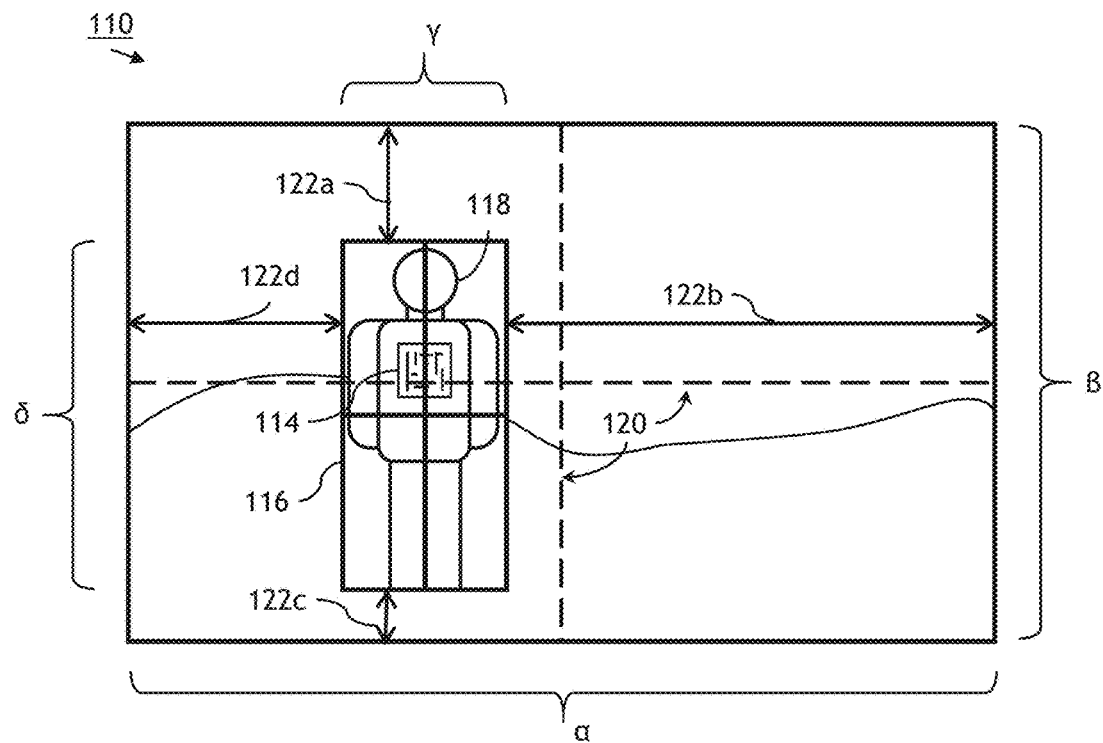
Figure 1D:
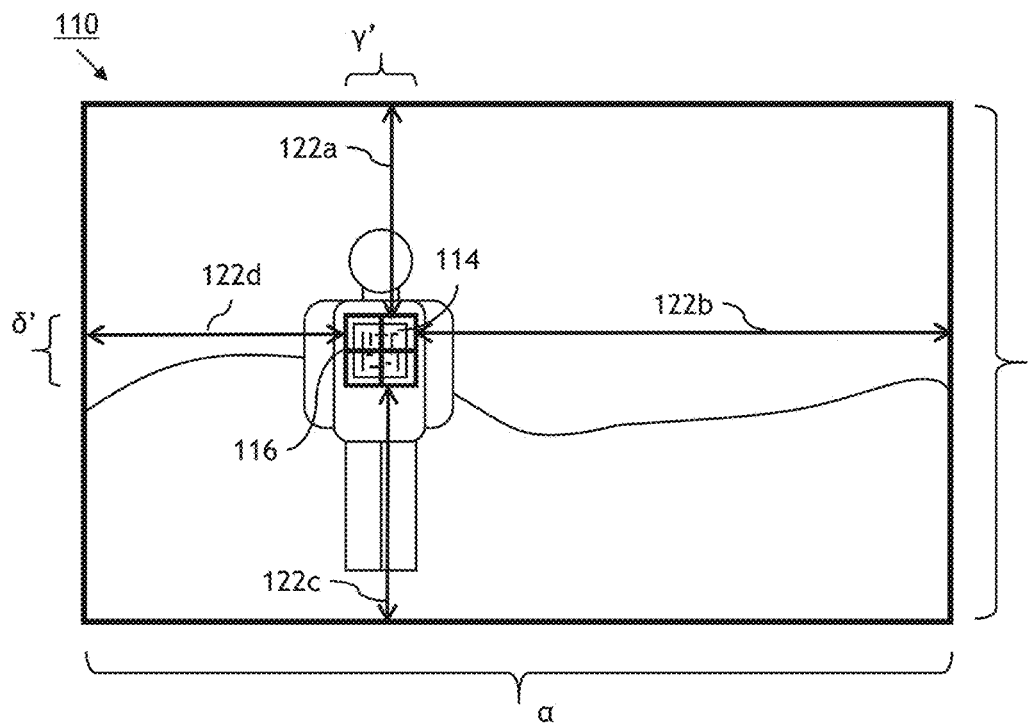
Figure 1E:
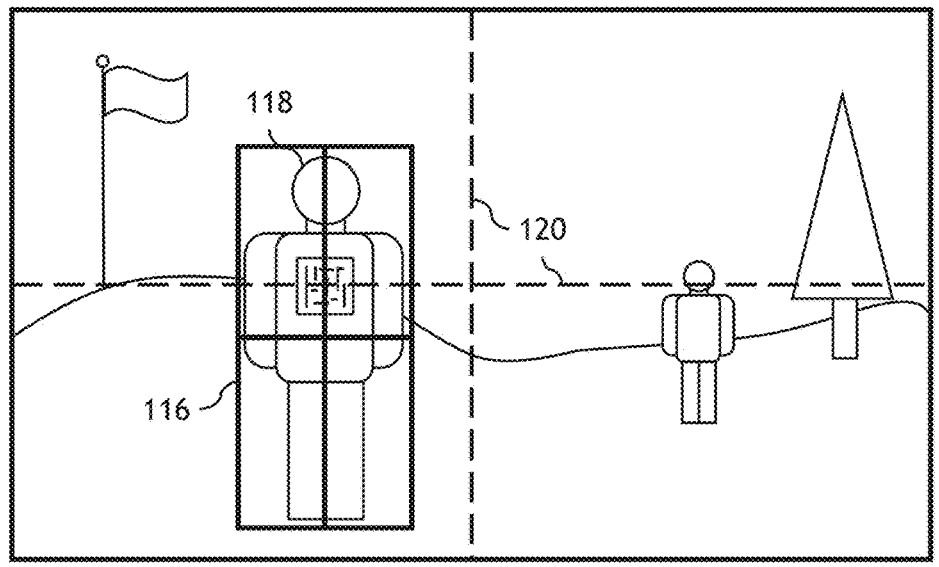
Figure 1F:
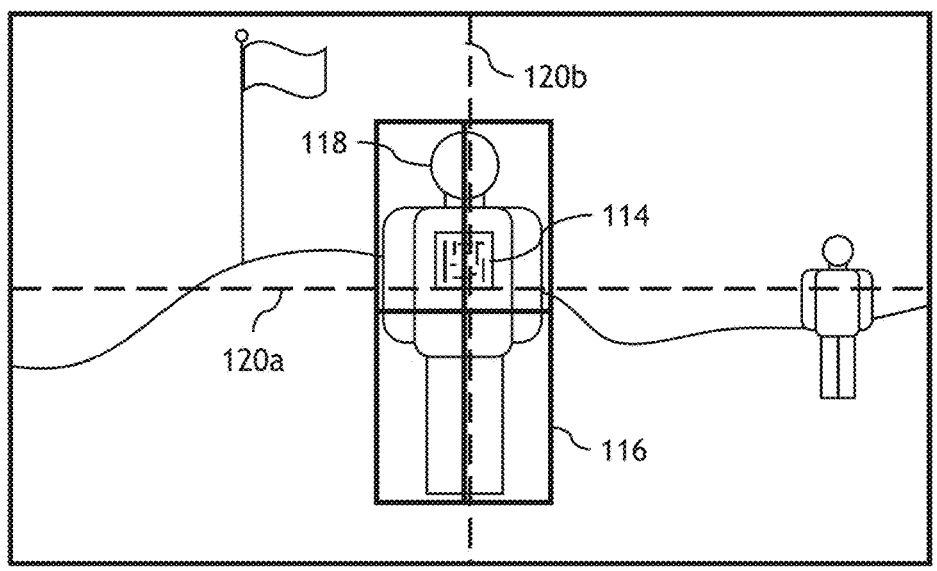

Referring to FIGS. 1C and 1D, in one embodiment the action camera system selects potential target object 112b (as seen in FIG. 1A) as target 118, and determines a desired orientation of the target 118 to the frame 110. For example, the target 118 may direct the action camera system 200 to select himself or herself as a target via user command sent by a smartphone 140 carried by the target 118. In one embodiment, smartphone 140 is equipped with an application interface that provides both user input and position data to action camera system 200 and UAV 100 via a wireless link 214. In one embodiment, the action camera system 200 determines a desired orientation by generating bounding box 116 associated with target 118. For example, the action camera system may compare the pixel size γ*δ of bounding box 116 (which has a height of δ pixels and a width of γ pixels) with the pixel size (ex.—resolution) α*β of frame 110 (width α, height β) to determine a relative distance between UAV 100 and target 118. Referring to FIG. 1D, in one embodiment the action camera system 200 similarly creates a bounding box 116 (of height of γ', width of δ', and pixel size γ'*δ') associated with pattern 114. In one embodiment, the action camera system 200 further determines the orientation of target 118 (and pattern 114) to frame 110 by analyzing the position of bounding boxes 116 relative to the centerlines 120 and borders (denoted by distances 122a, 122b, 122c, 122d from bounding box to frame boundary) of frame 110. For example, the action camera system 200 may use orientation information derived from a reference image 110 in addition to position data provided by smartphone 140, or by attitude control sensors 218, to establish a desired angle of elevation and a desired bearing relative to target 118. Referring to FIGS. 1E and 1F, in one embodiment the action camera system 200 determines a desired orientation by adjusting the position of UAV 100 relative to target 118. For example, FIG. 1E shows target 118 positioned slightly left of the centerlines 120 of frame 110, while FIG. 1F represents an adjustment to the position of UAV 100 in order to maintain target 118 at the desired orientation, i.e., centrally framed in frame 110. In one embodiment, action camera system 200 directs the attitude control system 232 to adjust the speed of one or more rotors 208, thereby adjusting the speed, direction, or rotational orientation of UAV 100.

In one embodiment, a desired orientation includes a set of parameters representing an ideal position of the UAV 100 relative to target 118, from which perspective the action camera system 200 can provide streaming video images of the target 118 in a given environment. In one embodiment, a desired orientation may be automatically generated by the action camera system 200 or preprogrammed by a user through an application installed on smartphone 140. In one embodiment, the action camera system 200 is preprogrammed with various modes of operation governing automatic operations of the system and its components (both positional and video) according to a desired set of objectives. In one embodiment, preprogrammed modes include information about suggested camera orientations, tracking distances, movement sequences (e.g., a continuous shot of a target from a UAV revolving around the target at a given distance) or cinematographic settings (e.g., frame rates, frame speeds, likely lighting conditions, etc.) For example, skiers, snowboarders or equestrians may select an automatic mode that follows them down a course at a given distance behind the head, perhaps changing perspective at points along the course. Baseball players may select a mode that provides a 360-degree rotational view of a pitcher's windup, follows the baserunner if the ball is struck, and may return to the pitcher or remain with the baserunner depending on the outcome of the play. Similarly, curlers may select a mode that provides a rotational view of the shooter's windup at the hack but then moves back to a wide-angle overhead view to follow the trajectory of a released stone, returning downward for a close overhead view as the stone arrives at the house. Soccer players may select a mode that, rather than following an individual player, tracks the progress of the ball around the field.

In one embodiment, an orientation includes both absolute parameters (information about the absolute position of the UAV 100, e.g., relative to true north) and relative parameters (information about the position of UAV 100 relative to a selected target 118). For example, absolute parameters used by the action camera system 200 may include, but are not limited to, absolute longitude and latitude, absolute altitude (AGL/MSL), and absolute headings. In one embodiment, the action camera system 200 determines and logs relative parameters based on data obtained from onboard attitude sensors 218, orientation data derived from analysis of frame 110, or position data received from a smartphone 140 via wireless link 214.

Figure 2A:
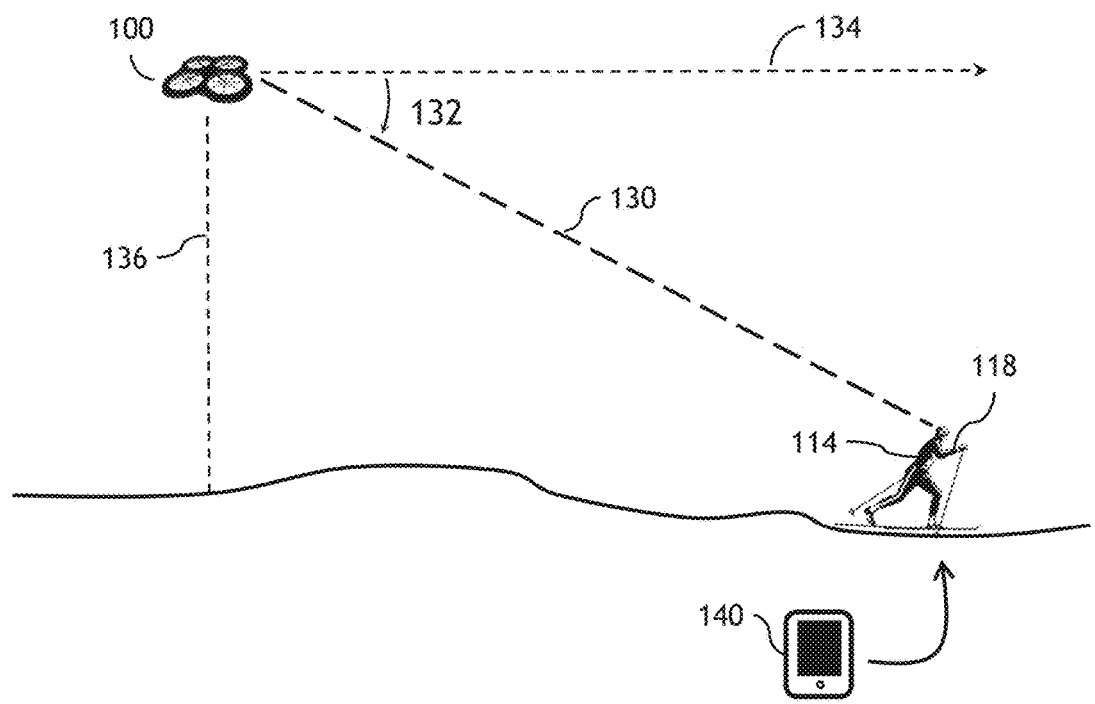
FIGS. 2A and 2B are diagrammatic illustrations of tracking parameters according to embodiments of the present invention.
Figure 2B:
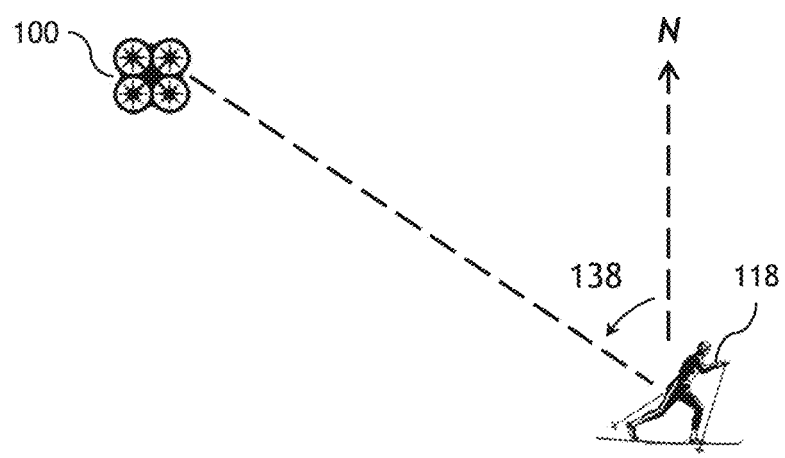

FIGS. 2A and 2B illustrate examples of relative parameters between the UAV 100 and target 118 used by embodiments of the action camera system 200 according to the present invention. Referring to FIG. 2A, in one embodiment the action camera system 200 aboard UAV 100 may determine an orientation to target 118 (and/or pattern 114) by determining an angle of elevation 132 to the target 118 relative to the horizon 134. In one embodiment, UAV 100 may adjust its angle of elevation to target 118 via gimbals that allow camera 210 to rotate or move relative to the UAV 100. In one embodiment, if the camera 210 is fixed relative to UAV 100, the action camera system 200 adjusts the rotational orientation of UAV 100 (and thus camera 210) by directing the attitude control system 232 to vary the speed of one or more rotors 208, thereby altering the pitch, yaw, or roll angle of UAV 100 as desired. In one embodiment, a sonar module 216 of the action camera system 200 may provide information about the altitude 136 of UAV 100 relative to the ground. Referring to FIG. 2B, in one embodiment the action camera system 200 determines a heading or bearing 138 of target 118 relative to UAV 100 according to onboard attitude control sensors 218 or position data received from smartphone 140. In one embodiment, the action camera system 200 establishes a fixed heading relative to target 118 once the target is selected, and follows that relative heading as a component of maintaining the desired orientation.

Figure 3:
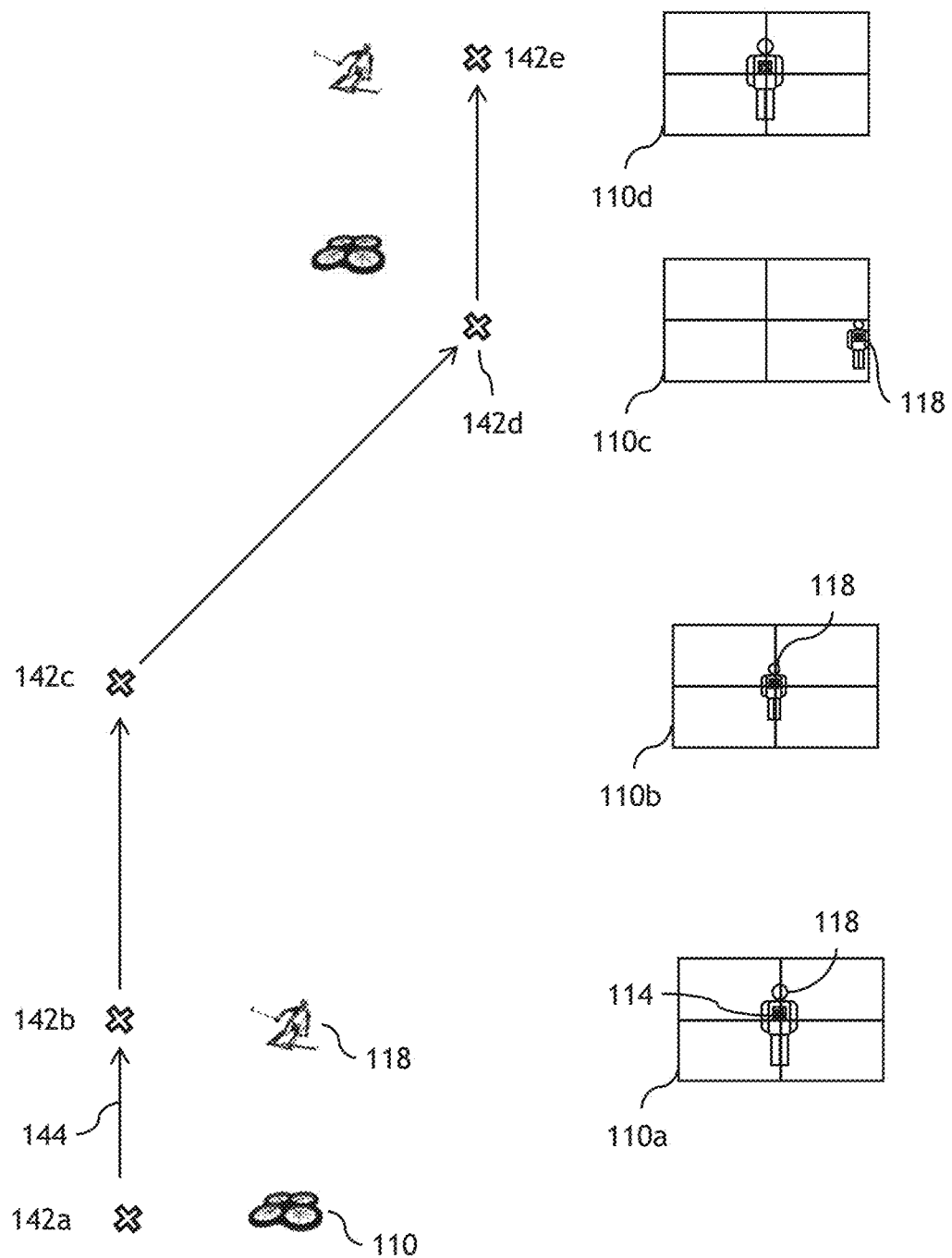
FIG. 3 is a diagrammatic illustration of target tracking by an action camera system according to embodiments of the present invention.

Referring to FIG. 3, the action camera system 200 aboard UAV uses visual intelligence to track and follow a target 118 at the micro level according to embodiments of the present invention. In one embodiment, the action camera system 200 (aboard UAV 100 at position 142a) selects skier 118 (at position 142b) as a target. In one embodiment, the action camera system 200 directs UAV 100 to follow skier 118 at distance 144, providing streaming video from a position behind the head of skier 118. In one embodiment, the action camera system 200 analyzes a reference frame 110a, which portrays skier 118 (to which pattern 114 has been affixed) in a desired orientation (ex.—centrally framed). In one embodiment, UAV 100 matches the initial speed of skier 118, but when skier 118 reaches point 142b the action camera system 200 notes that the streaming image of skier 118 (as seen in frame 110b) is smaller than optimal size while still centrally framed relative to frame 110b. In one embodiment, the action camera system 200 determines that the relative distance between UAV 100 and skier 118 is greater than it should be, and directs UAV 100 to increase speed in order to reestablish the optimal tracking distance to skier 118. In one embodiment, skier 118 reaches point 142d after having changed direction, so frame 110c shows an image of skier 118 that is neither centrally framed nor optimally sized. In one embodiment, the action camera system responds by changing not only the speed, but the heading, of UAV 100 so as to follow skier 118 at the desired distance and orientation. In one embodiment, at point 142d the action camera system 200 has re-established the desired orientation and following distance to skier 118, and the resulting image 110d corresponds to a desired orientation of skier 118 in both size and position.

Figure 4:
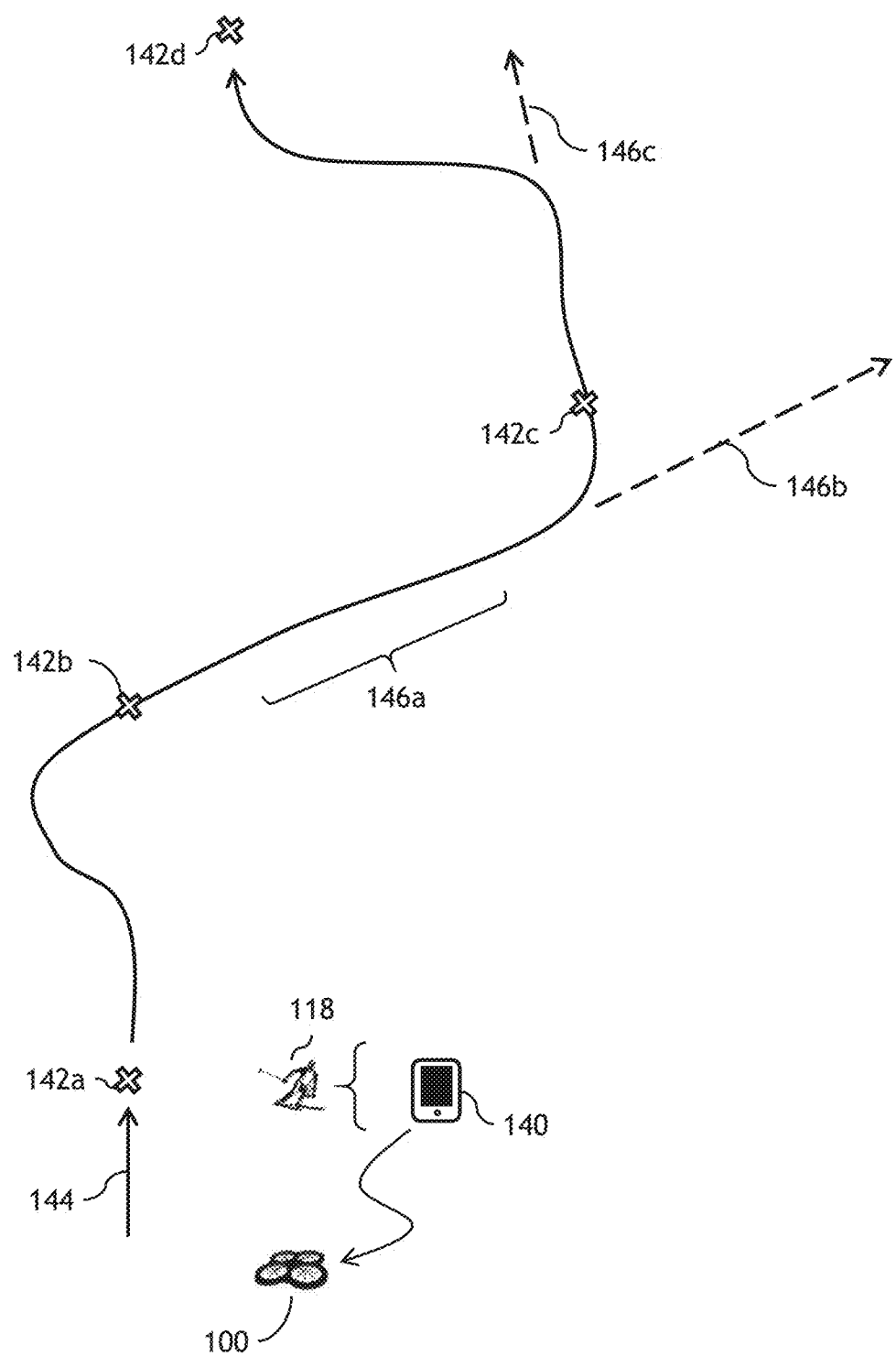
FIG. 4 is a diagrammatic illustration of target tracking by an action camera system according to embodiments of the present invention.

Referring to FIG. 4, for a variety of reasons (e.g., radical shifts in direction, suboptimal visibility) it may be desirable to supplement the visual tracking capability of the action camera system 200 with real-time position data about a target 118. In one embodiment, skier 118 carries on his/her person smartphone 140, which provides real-time position data to assist action camera system 200 in maintaining a desired orientation to skier 118 at the macro level. For example, smartphone 140 may include an onboard accelerometer 142, inclinometer 150, magnetometer 148, GNSS receiver 152, gyrometer 146, or other location sensor in the form of an application installed on the smartphone 140. In one embodiment, the action camera system 200 includes a received signal strength indicator (RSSI) 226 for assessing position information about smartphone 140 based on the strength of the signal received via wireless link 214. In one embodiment, an application installed on smartphone 140 enables real-time data from onboard sensors to be transmitted via wireless link 214 to the action camera system 200. In one embodiment, UAV 100 begins tracking skier 118 at point 142a, following directly behind at distance 144 as in FIG. 3. In one embodiment, skier 118 has radically changed course and the action camera system 200 may no longer be able to establish a visual lock on pattern 114 or skier 118. For example, as skier 118 proceeds from point 142b along portion 146a, the smartphone 140 of skier 118 may feed information about the position and relative movement of skier 118 to the action camera system 200, directing UAV 100 to a location where the action camera system 200 is most likely to re-establish visual contact. In one embodiment, the action camera system 200 further processes position data received from smartphone 140 in order to predictively analyze the future position or future direction of skier 118. For example, the action camera system 200 may use current and previous position data to plot a possible trajectory 144b for skier 118, assess the velocity or acceleration of skier 118 (and direct UAV 100 to match it), or determine the position of skier 118 at a given future time. In one embodiment, at point 142c skier 118 has diverted from the previous course 144b; the action camera system 200 then uses position data to determine a new course 144c for skier 118 if a visual lock cannot be maintained, and determines a new position as skier 118 diverts from course 144c toward point 142d.

Figure 5:
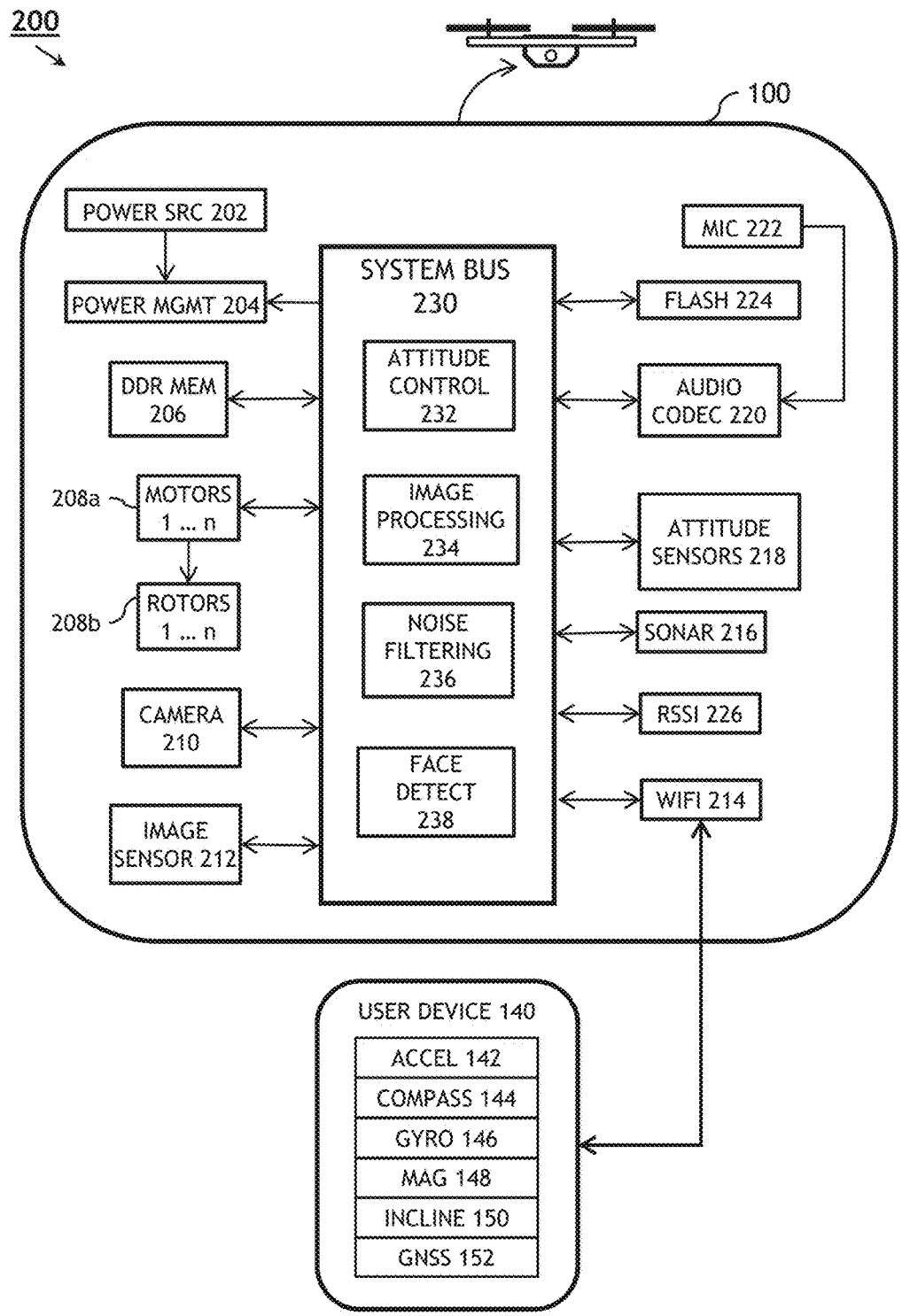
FIG. 5 is a schematic diagram of an action camera system according to embodiments of the present invention.

Referring to FIG. 5, in embodiments an action camera system 200 includes components aboard UAV 100 and a smartphone 140 or other like communications device carried by a target 118. In one embodiment, the action camera system may include batteries or other onboard power sources 202 and a power management circuit 204 for controlling power distribution to, and conservation by, components of the UAV 100. In one embodiment, smartphone 140 includes position sensors that detect and report real-time position data about a target 118 to the image processor 234 aboard UAV 100 via wireless link 214. For example, components installed on smartphone 140 may include an accelerometer 142, a compass 144, a gyrometer 146, a magnetometer 148, an inclinometer 150, and a GNSS receiver 152. In one embodiment, the system bus 230 of action camera system 200 includes an image processor 234. In one embodiment, image processor 234 analyzes the stream of images captured by camera 210 and image sensor 212 to select a target 118 and determine optimal and current orientations of the target 118 to the UAV 100. In one embodiment, the action camera system 200 includes audio codecs 220 for processing real-time streaming audio captured by onboard microphones 222. In one embodiment, the action camera system 200 also includes a noise reduction/filtering system 236 for analyzing the incoming audio stream to remove engine noise or other frequencies associated with the operation of UAV 100. In one embodiment, action camera system 200 additionally includes a face detection system 238. For example, the face detection system 238 may enable the action camera system to establish and maintain a visual lock on a target 118 based on analysis of distinctive facial features of the target 118. In one embodiment, the face detection system 238 may utilize Viola-Jones or other facial recognition algorithms, pixel analysis, vote-matching, cascade recognition, or other visual recognition techniques to isolate a human target 118 from its surroundings and determine position information about the target 118 or other image elements found in the environment. In one embodiment, the action camera system 200 includes onboard data storage and memory 206 as well as removable data storage and memory units 224.

Figure 6:
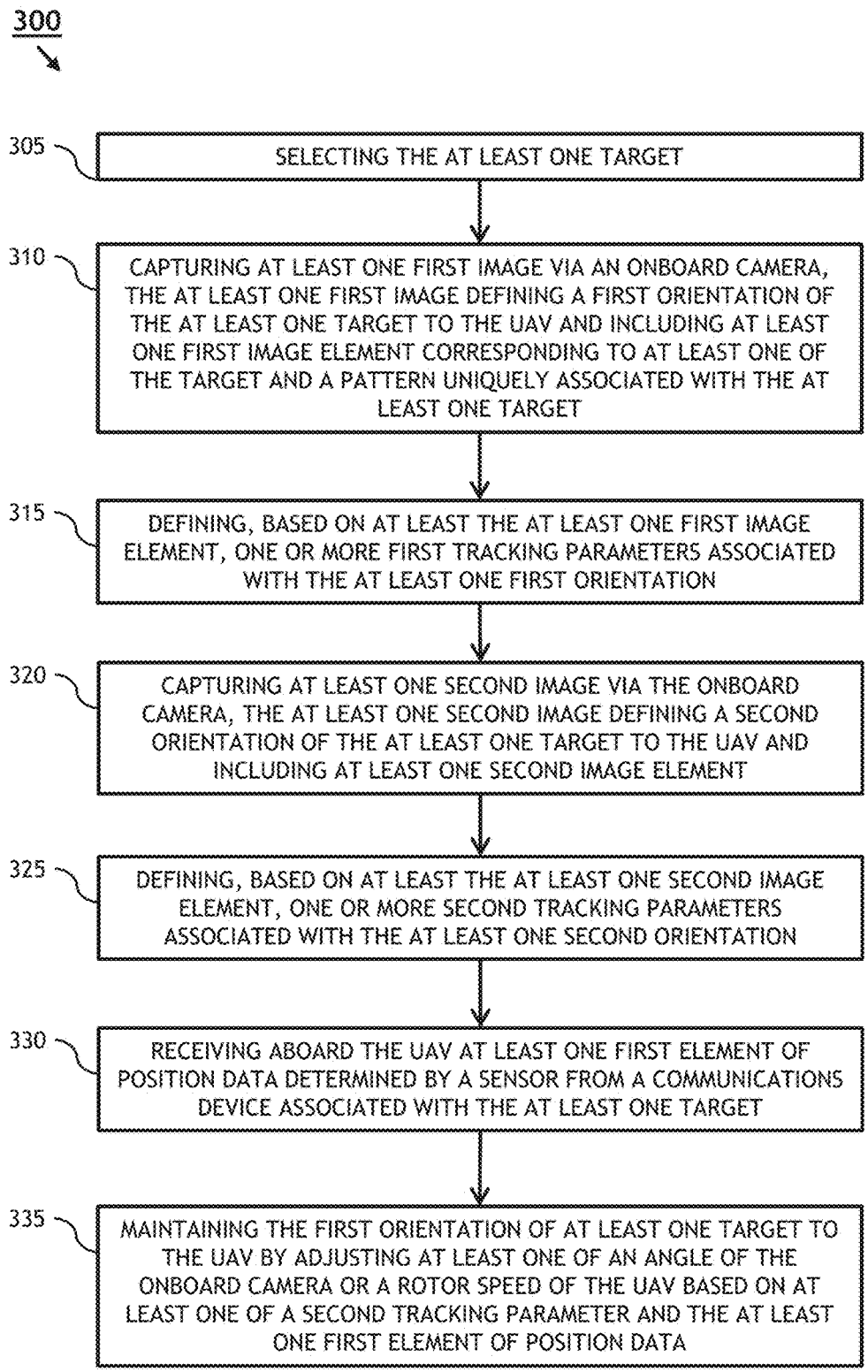
FIG. 6 is a process flow diagram of a method of operation for an action camera system according to embodiments of the present invention.

FIG. 6 illustrates a process flow diagram of a method 300 for tracking at least one target 118 selected from one or more potential target objects 112 via an action camera system 200 and an unmanned aerial vehicle (UAV) 100 according to an embodiment of the present invention. It is noted herein that the method 300 can be carried out utilizing any of the embodiments described previously. It is further noted, however, that method 300 is not limited to the components or configurations described previously as multiple components and/or configurations can be suitable for executing method 300.

At step 305, method 300 selects the at least one target 118. At step 310, the method 300 captures at least one first image 110 via an onboard camera 210, the at least one first image 110 defining a first orientation of the at least one target 118 to the UAV 100 and including at least one first image element corresponding to at least one of the target 118 and a pattern 114 uniquely associated with the at least one target 118. In one embodiment, the at least one first image 110 includes: (1) a first bounding box 116 corresponding to the at least one target 118, the first bounding box 116 associated with the first orientation and having a first pixel size and a first position relative to the at least one first image 110; and (2) a second bounding box 116 corresponding to the at least one pattern 114 uniquely associated with the at least one target 118, the second bounding box 116 associated with the first orientation and having a second pixel size and a second position relative to the at least one first image 110. At step 315, the method 300 defines, based on at least the at least one first image element, one or more first tracking parameters associated with the at least one first orientation. In one embodiment, the method 300 defines the one or more first tracking parameters based on at least one of the first pixel size, the first position, the second pixel size, and the second position.

At step 320, the method 300 captures at least one second image 110 via the onboard camera 210, the at least one second image 110 defining a second orientation of the at least one target 118 to the UAV 100 and including at least one second image element. In one embodiment, the method 300 attempts to identify within the at least one second image 110 at least one third image element corresponding to the at least one target 118, the at least one third image element including a third bounding box 116 associated with the second orientation and having a third pixel size and a third position relative to the at least one second image 110. In one embodiment, the method 300 attempts to identify within the at least one second image 110 at least one fourth image element corresponding to the pattern uniquely associated with the at least one target 118, the at least one fourth image element including a fourth bounding box 116 associated with the second orientation and having a fourth pixel size and a fourth position relative to the at least one second image 110. In one embodiment, the method 300 defines the at least one or more second tracking parameters based on at least one of the third pixel size, the third position, the fourth pixel size, and the fourth position. In one embodiment, if at least one of the third image element and the fourth image element cannot be identified, the method 300 defines the one or more second tracking parameters based on at least one of the at least one element of position data and at least one previously determined second tracking parameter.

At step 325, the method 300 defines, based on at least the at least one second image element, one or more second tracking parameters associated with the at least one second orientation. In one embodiment, the one or more first tracking parameters include at least one of a first distance 130 between the UAV 100 and the at least one target 118, a first angle of elevation 132 between the UAV 100 and the at least one target 118, and a first bearing 138 between the UAV 100 and the at least one target 118. In one embodiment, the one or more second tracking parameters include at least one of a second distance between the UAV 100 and the at least one target 118, a second angle of elevation 132 between the UAV 100 and the at least one target 118, and a second bearing between the UAV 100 and the at least one target 118. At step 330, the method 300 receives aboard the UAV at least one first element of position data determined by a sensor from a communications device 140 associated with the at least one target 118. In one embodiment, the method 300 receives aboard the UAV 100 at least one first element of position data determined at least one of an accelerometer 142, an inclinometer 150, a gyrometer 146, a magnetometer 148, a GNSS receiver 152, and an application installed on the at least one communications device 140 from the at least one communications device 140. In one embodiment, the method 300 determines at least one of a current position, an acceleration, a velocity, a heading, a bearing, and a future position based on the at least one element of position data.

At step 335, the method 300 maintains the first orientation of at least one target 118 to the UAV 100 by adjusting at least one of an angle of the onboard camera 210 or a rotor speed of the UAV 100 based on at least one of a second tracking parameter and the at least one first element of position data. In one embodiment, the method 300 maintains the first orientation of at least one target 118 to the UAV 100 by adjusting at least one of an angle of the onboard camera 210 or a rotor speed of the UAV 100 based on at least one of a second tracking parameter and the at least one of a current position, an acceleration, a velocity, a heading, a bearing, and a future position. In one embodiment, the method 300 compares the second orientation to the first orientation. In one embodiment, the method 300 maintains the first orientation of at least one target 118 to the UAV 100 by adjusting at least one of an angle of the onboard camera 210 or a rotor speed of the UAV 100 based on the comparison of the second orientation to the first orientation. In one embodiment, the method compares at least one of: the third pixel size and the first pixel size; the fourth pixel size and the second pixel size; the third position and the first position; and the fourth position to the second position.

The method 300 may include an additional step, in which the method 300 selects at least one operating mode from a plurality of operating modes, the at least one operating mode including at least one of an image resolution, a frame speed, an aspect ratio, an orientation of the at least one target 118 to the UAV 100, and a sequence of movements of the UAV 100 relative to the at least one target 118. In one embodiment, the method 300 maintains the first orientation of at least one target 118 to the UAV 100 by adjusting at least one of an angle of the onboard camera 210 or a rotor speed of the UAV 100 based on the at least one operating mode.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An action camera system attachable to a mobile platform, comprising:
   at least one electromagnetic (EM) sensor configured to generate a sequence of images by detecting EM radiation in at least two dimensions; and
   a control system electronically coupled to the at least one EM sensor, the control system including at least one processor and configured to:
   identify at least one potential target based on the image sequence;
   select at least one target from the at least one potential target by determining at least one reference orientation of the selected target to the mobile platform based on a reference image of the image sequence, the at least one reference orientation associated with at least one first image element of the reference image;
   determine at least one subsequent orientation of the selected target to the mobile platform based on a subsequent image of the image sequence, the at least one subsequent orientation associated with at least one second image element of the subsequent image;
   compare the at least one subsequent orientation to the at least one reference orientation; and
   restore the reference orientation based on the comparison of the subsequent orientation to the reference orientation by adjusting at least one of a velocity of the mobile platform and a heading of the mobile platform.

2. The action camera system of claim 1, wherein the mobile platform includes an unmanned aerial vehicle (UAV).

3. The action camera system of claim 1, wherein:
the at least one EM sensor is pivotably mounted to the mobile platform; and
the control system is configured to restore the reference orientation by adjusting an orientation of the at least one EM sensor to the mobile platform.

4. The action camera system of claim 1, wherein the control system is configured to restore the reference orientation based on one or more of the comparison of the subsequent orientation to the reference orientation and position data.

5. The action camera system of claim 4, wherein the position data includes at least one of:
position data of the mobile platform relative to at least one reference point, the position data generated by at least one position sensor coupled to the mobile platform; and
remote position data received from at least one mobile device attached to the selected target and wirelessly coupled to the action camera system.

6. The action camera system of claim 5, wherein the position data includes a signal strength associated with the received remote position data, the signal strength determined by the control system.

7. The action camera system of claim 5, wherein the control system is configured to determine a position of the mobile platform based on the received remote position data.

8. The action camera system of claim 1, wherein the at least one first image element and the at least one second image element include one or more of:
a pattern associated with the selected target;
a face associated with the selected target;
a pseudorandom pattern;
a retroreflective surface; and
encoded data.

9. The action camera system of claim 1, wherein the control system is configured to generate an audio stream corresponding to the image sequence by processing at least one audio signal received from a microphone coupled to the mobile platform.

10. The action camera system of claim 1, wherein:
the at least one reference orientation is associated with at least one of a) a size of the at least one first image element relative to the at least one reference image and b) a position of the at least one first image element relative to the at least one reference image; and
the at least one subsequent orientation is associated with at least one of a) a size of the at least one second image element relative to the at least one subsequent image and b) a position of the at least one second image element relative to the at least one subsequent image.

* * * * *